United States Patent [19]
Körner et al.

[11] Patent Number: 5,788,292
[45] Date of Patent: Aug. 4, 1998

[54] CONNECTOR FOR THE PIPE COUPLING OF A HIGH-PRESSURE CLEANING APPARATUS

[75] Inventors: Helmut Körner, Backnang; Helmut Gassert, Allmersbach; Peter Klein, Winnenden; Roland Schick, Auenwald; Eberhard Veit, Göppingen, all of Germany

[73] Assignee: Alfred Karcher GmbH & Co., Winnenden, Germany

[21] Appl. No.: 815,226

[22] Filed: Mar. 12, 1997

Related U.S. Application Data

[63] Continuation of PCT/EP94/03043 Sep. 12, 1994.
[51] Int. Cl.⁶ .................. F16L 19/02; F16L 33/00
[52] U.S. Cl. .................. 285/334.4; 285/256
[58] Field of Search .................. 285/256, 334.4, 285/328, 259, 332

[56] References Cited

U.S. PATENT DOCUMENTS

| | | | |
|---|---|---|---|
| 3,092,404 | 6/1963 | MacWilliam | 285/334.4 |
| 3,393,930 | 7/1968 | Ziherl et al. | 285/334.4 |
| 3,502,355 | 3/1970 | Demler | 285/334.4 |
| 4,671,542 | 6/1987 | Juchnowski | 285/256 |
| 5,110,160 | 5/1992 | Brozovic | 285/334.4 |
| 5,364,134 | 11/1994 | Anderson | 285/256 |

FOREIGN PATENT DOCUMENTS

| | | | |
|---|---|---|---|
| 448317 | 5/1948 | Canada | 285/334.4 |
| 1000956 | 2/1952 | France . | |
| 29 26 215 | 1/1980 | Germany . | |
| 42 18 347 | 12/1993 | Germany . | |
| 681 558 | 4/1993 | Switzerland . | |

*Primary Examiner*—Eric K. Nicholson
*Attorney, Agent, or Firm*—Barry R. Lipsitz

[57] ABSTRACT

In a connector provided with a coupling ring for the pipe coupling of a high-pressure cleaning apparatus, the pipe coupling comprising a coupling sleeve with a conical sealing surface, a circular-cylindrical sealing surface adjacent thereto, and an outer thread for the coupling ring of the connector, with a cylindrical nipple carrying a ring seal and sealingly positionable at the circular-cylindrical sealing surface of the coupling sleeve, and a convex sealing shoulder for sealing abutment on the conical sealing surface of the coupling sleeve, the coupling ring being mounted on the connector so as to be freely rotatable and essentially immovable in the axial direction, in order to improve the mechanical protection of the coupling parts against damage, it is proposed that the coupling ring protrude in the axial direction over the free end of the nipple, and that the ratio of the length of the nipple to the outer diameter thereof be between 0.4 and 0.3.

19 Claims, 1 Drawing Sheet

CONNECTOR FOR THE PIPE COUPLING OF A HIGH-PRESSURE CLEANING APPARATUS

This application is a continuation of International PCT application Ser. No. PCT/EP94/03043, filed on Sept. 12, 1994.

BACKGROUND OF THE INVENTION

The invention relates to a connector provided with a coupling ring for the pipe coupling of a high-pressure cleaning apparatus, the pipe coupling comprising a coupling sleeve with a conical sealing surface, a circular-cylindrical sealing surface adjacent thereto, and an outer thread for the coupling ring of the connector, with a cylindrical nipple carrying a ring seal and sealingly positionable at the circular-cylindrical sealing surface of the coupling sleeve, and a convex sealing shoulder for sealing abutment on the conical sealing surface of the coupling sleeve, the coupling ring being mounted on the connector so as to be freely rotatable and essentially immovable in the axial direction.

Such connectors have proven reliable in pipe connections of high-pressure cleaning apparatus, in particular, for connecting a high-pressure hose to the coupling sleeve of a high-pressure cleaning apparatus.

Such a connector is known, for example, from DE 42 18 347 A1.

Such connectors are exposed to maximum stresses in high-pressure cleaning apparatus, more specifically, of both a mechanical and a chemical kind. These connectors are often handled negligently by the operators, with the result that damage frequently occurs to the sensitive sealing surfaces and, in particular, to the ring seals.

It has also proven disadvantageous that the sealing connections in the connector can become caked so firmly by lime deposits and the like that release of the connection by hand is no longer possible. When such connections are released with the use of high force, there is also the danger that the sealing surfaces will suffer mechanical damage, which can result in overall impairment of the sealing effect.

The object underlying the invention is to so design a connector of the generic kind that damage to the connector due to careless handling of the connector, on the hand, or due to release of caked connections with the use of force, on the other hand, can be avoided.

SUMMARY OF THE INVENTION

This object is accomplished in accordance with the invention with a connector of the kind described at the outset by the coupling ring protruding in the axial direction over the free end of the nipple and by the ratio of the length of the nipple to the outer diameter thereof being between 0.4 and 0.3.

Surprisingly, it has been found that these measures accomplish the set object in an extremely simple way. In conventional connectors, the nipples were so long that they protruded from the coupling ring. This facilitates introduction of the nipple into the connector, but, on the other hand, entails the danger that, in the event of careless handling of the connector, the protruding areas of the nipple will strike other objects and thereby become damaged.

Therefore, in the present invention, the coupling ring is designed so as to protrude over the nipple so the nipple as a whole is protected against mechanical damage in the interior of the coupling ring as if it were in a cage.

At the same time, the length of the nipple is quite considerably reduced in comparison with conventional connectors. Nipples whose length clearly exceeded half of the diameter of the nipple were used in conventional connectors. In many cases, lengths which corresponded approximately to the diameter of the nipple were used. This was based on the concept that the outer surface of the nipple acts as sealing surface and should, therefore, be as long as possible in order to achieve good sealing.

In the present invention, this concept is dispensed with. In contrast to the conventional technique, the nipple is so short that the contact surfaces between the nipple and the cylindrical sealing surface are reduced to a minimum. Surprisingly, this does not impair the sealing effect. This continues to be reliably assumed essentially by the ring seal. However, as a result of the reduction of the overlapping of the cylindrical sealing surface and the cylindrical outer surface of the nipple, only a very small area is available for deposits, and caking can only occur in this area. This area is so small that an operator can easily release this caking with little trouble and without a tool, and, therefore, damage in this area can also be reliably prevented.

A very special advantage of this embodiment is also that the risk of damage during assembly of the pipe coupling is significantly reduced. In known pipe couplings, the first contact occurs in the area of the protruding nipple, and misadjustments here can easily result in damage to the nipple surface and also to the ring seal.

In the present construction, a first contact of the two parts of the pipe coupling occurs in the area of the protruding coupling ring. This then guides the nipple into the coupling sleeve when the coupling parts are pushed further together, and the danger of misadjustment and thus damage no longer exists. On the contrary, by pushing the coupling ring onto the outer thread of the coupling sleeve, the nipple is introduced into the coupling sleeve in exact alignment with the cylindrical sealing surface thereof, and the nipple moves into the coupling sleeve precisely on the longitudinal axis of the cylindrical sealing surface of the coupling sleeve. Misadjustments are, therefore, excluded.

This combination of features thus results in a connector whose sensitive sealing parts have considerably better protection against any kind of damage than in known connectors. In addition, the assembly is facilitated by the user not having to introduce the nipple into the coupling sleeve, it being sufficient to place the coupling ring on the coupling sleeve and then screw it onto the coupling sleeve. The sealing is then made automatically and reliably.

Surprisingly, it has been found that the shortening of the nipple surface to the sealing properties does not have any disadvantageous effect whatsoever. On the contrary, a substantially better and more lasting sealing is achieved as damage to the nipple can be safely avoided.

In an advantageous embodiment of the invention, provision may be made for the axial extent of the cylindrical surface of the nipple between the convex sealing shoulder and a ring groove accommodating the ring seal to be between 0.2 and 0.1 of the outer diameter of the nipple. This surface is deliberately chosen short to minimize the effects of caking.

Furthermore, provision may be made for the axial extent of the cylindrical surface of the nipple between a ring groove accommodating the ring seal and the free end of the nipple to be between 0.1 and 0.05 of the outer diameter of the nipple. Therefore, in this area, too, the nipple is made as short as possible in the axial direction, only long enough to close off the ring groove in the axial direction.

It is expedient for the coupling ring to protrude over the free end of the nipple by at least 2.5 mm. This provides reliable protection of the nipple, also in the event of careless handling of th e connector, for example, when a high-pressure hose is thrown around on a stony ground.

Assembly of the described pipe coupling is facilitated by the coupling ring carrying an inner thread starting at its free edge and by the outer thread of the coupling sleeve adjoining a cylindrical guide surface at the free end of the coupling sleeve. The outer thread of the coupling sleeve is thus set back from the free edge thereof. When joining the two parts of the pipe coupling, the user can, therefore, first bring the free end of the coupling ring up to the cylindrical guide surface and then push the coupling ring over a certain axial length onto the coupling sleeve without a screw movement being necessary in this part. This facilitates the mutual adjustment of the two parts of the pipe coupling, and the nipple enters the coupling sleeve only when engagement of the coupling ring and the cylindrical guide surface already guides these reliably relative to each other. Misadjustment of the two parts is thereby excluded. Any misadjustments during joining of the parts are accommodated by the coupling ring and the cylindrical guide surface of the coupling sleeve. Even if these should suffer damage, this has no influence whatsoever on the sensitive sealing surfaces which remain protected during the entire making of a pipe connection.

It has proven advantageous, in accordance with a preferred embodiment, for the convex sealing shoulder to continue into a cylindrical stop against which the coupling ring rests, and for the ratio of the axial extent of this cylindrical stop to the outer diameter thereof to be between 2 and 0.5. This cylindrical stop is, therefore, relatively long and so the coupling ring also has a corresponding length. This facilitates handling of the coupling ring which may additionally have an extended gripping surface, for example, by using a very thick end wall of the coupling ring.

In a further preferred embodiment, provision is made for the nipple to comprise in its section located between a groove accommodating the ring seal and its free end, over a circumferential area, an opening providing access to the groove as far as the bottom thereof. This groove is preferably delimited by a chord of the circular cross section which extends at a tangent to the bottom of the groove. Such an opening makes it possible to reach under the ring seal from the end face and lift it out of the groove for the purpose of exchanging it. For design reasons, this groove is always located inside the coupling ring, and removal of the ring seal sideways from the groove would prove difficult owing to the surrounding coupling ring, which is different from known constructions in that in known constructions the ring seal is usually located outside the coupling ring and is, therefore, readily accessible from the circumference. Provision of an opening in the end face of the nipple enables axial access to the groove and thereby facilitates exchange of the ring seal.

The following description of a preferred embodiment of the invention serves in conjunction with the drawings to explain the invention in greater detail.

BRIEF DESCRIPTION OF THE INVENTION

FIG. 1 a longitudinal, sectional view of a pipe coupling with a coupling sleeve and a connector in the assembled state; and FIG. 2 a view of the hose nipple of the connector from the end face.

DETAILED DESCRIPTION OF THE INVENTION

Figure 1:
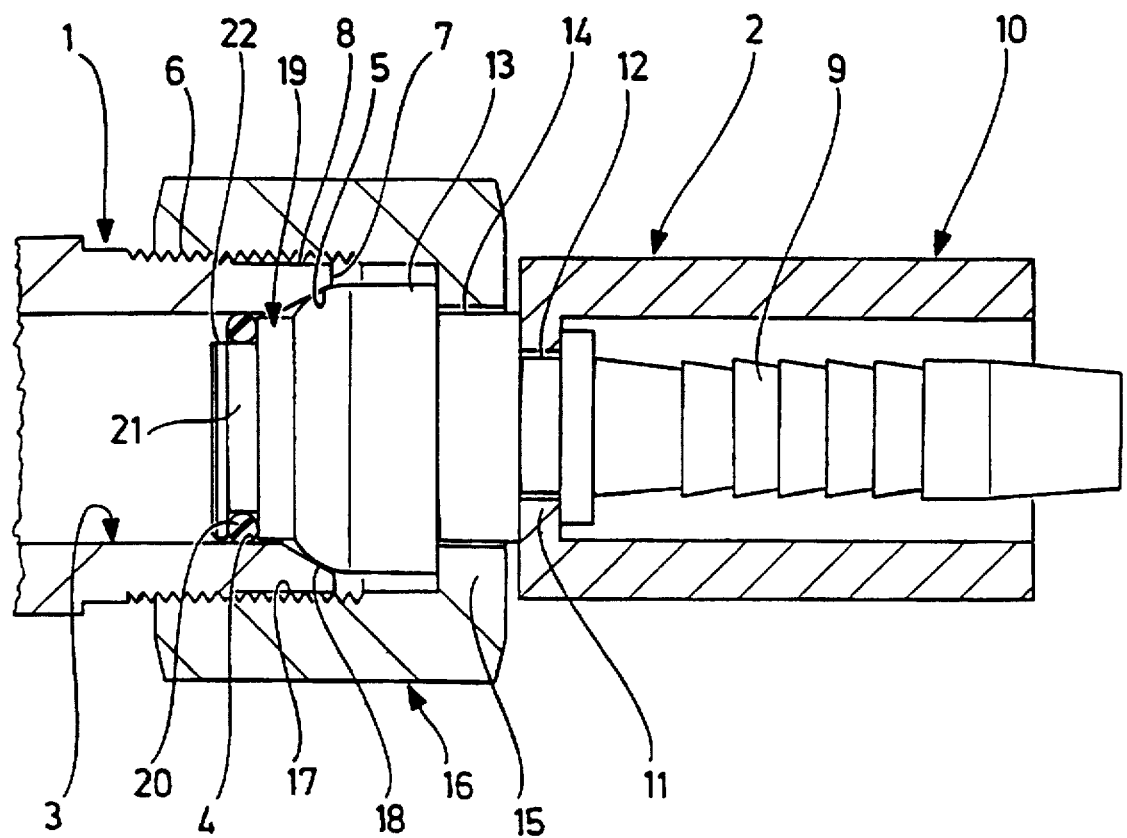

The pipe coupling illustrated in the drawings comprises a coupling sleeve 1 and a connector 2. The coupling sleeve 1 which can be arranged, for example, at the high-pressure outlet of a high-pressure cleaning apparatus comprises a cylindrical, inner bore 3, the inside wall of which forms a cylindrical sealing surface 4. Adjoining this cylindrical sealing surface 4 towards the end of the coupling sleeve 1 is a conically expanding sealing surface 5.

The coupling sleeve 1 carries on the outside thereof an outer thread 6 which extends coaxially with the longitudinal axis of the coupling sleeve and starts at a spacing from the free edge 7 of the coupling sleeve 1. Arranged between this outer thread 6 and the free edge 7 is a cylindrical guide surface 8, the outer diameter of which is selected such that an inner thread which fits onto the outer thread 6 can be pushed in a guided manner over this guide surface 8.

The connector 2 comprises a connecting plug 9 onto which a hose, for example, a flexible high-pressure hose, can be pushed. The connecting plug 9 is surrounded by a grip sleeve 10 which is held axially immovably and non-rotatably on the connector 2, for example, by its end wall 11 engaging corresponding recesses 12 on the connector 2.

The end wall 11 forms together with a cylindrical ring shoulder 13 a circumferential groove 14 on the connector 2. The end wall 15 of a pot-shaped coupling ring 16 engages the circumferential groove 14 and is thereby mounted so as to be freely rotatable and, at most, displaceable to a slight extent in the axial direction, but is otherwise fixed on the connector 2. This coupling ring 16 carries an inner thread 17 which extends from the free end of the coupling ring 16 over a substantial part of its axial extent and fits onto the outer thread 6 of the coupling sleeve 1.

The cylindrical ring shoulder 13 continues via a section 18 of arc-shaped cross section into a circular-cylindrical nipple 19, the outer diameter of which is smaller than that of the cylindrical ring shoulder 13. The arc-shaped section 18 forms a convex sealing surface, the nipple 19 a cylindrical sealing surface. Arranged in the nipple 19 is a ring groove 21 which extends in the circumferential direction and in which a ring seal 20, for example, in the form of an O-ring, is placed. Together with the nipple 19, this ring seal 20 forms a cylindrical sealing surface. The dimensions of the nipple 19 are chosen such that the total length of the nipple between the arc-shaped section 18 and the free end is between 0.3 and 0.4 of the outer diameter of the nipple, and the lengthwise extent of the cylindrical section between the arc-shaped section 18 and the ring groove 21 is between 0.1 and 0.2 of the outer diameter of the nipple. The cylindrical section between the ring groove and the free end of the nipple has a lengthwise extent of the order of 0.05 to 0.1 of the outer diameter of the nipple.

The nipple 19 is fully accommodated in the interior of the coupling ring 16. The spacing between the free end of the nipple 19 and the free edge of the coupling ring is at least 2.5 mm.

Figure 2:
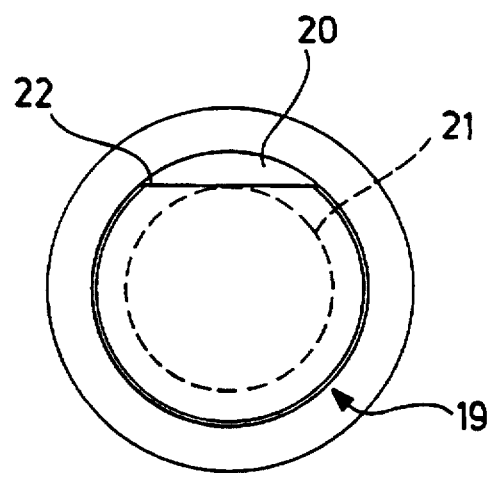

A sector-shaped opening 22 is provided in the cylindrical area between the ring groove 21 and the free end of the nipple 19. The opening 22 is delimited by a chord extending at a tangent to the bottom of the ring groove 21 (FIG. 2). This opening 22 provides access to the ring groove 21 from the end face, which makes it possible to exchange the ring seal 20.

When making a coupling by axially joining the coupling sleeve 1 and the connector 2, the free edge of the coupling ring 16 first moves onto the guide surface 8 and slides thereon until the inner thread 17 rests against the outer thread 6. During this part of the movement, the nipple 19 is introduced at a spacing into the conical part of the coupling sleeve 1, without touching the coupling sleeve 1, and so there is no danger of damage occurring to the sealing surfaces. A further axial approach is then brought about by screwing the coupling ring onto the coupling sleeve 1. The nipple 19 thus enters the inner bore 3 until the arc-shaped section 18 rests in the form of a line against the conical sealing surface 5 of the coupling sleeve 1, which produces a double sealing, namely, firstly, by the ring seal 20 and the cylindrical sealing surface 4 and, secondly, by the arc-shaped section 18 and the conical sealing surface 5. In no phase of the assembly is there any risk of damage to these sealing surfaces as they are only moved in precisely axial direction relative to each other. The overlapping of the cylindrical surfaces of the nipple 19 and the cylindrical sealing surface 4 is slight, and, therefore, there is also little space for deposits which could cause the two parts to become caked together. Release of this connection is thus readily possible.

When the connection is released, the nipple 19 is also protected on all sides by the coupling ring 16 and so in this phase, too, there is no risk of damage to the nipple 19 and the sensitive sealing surfaces.

What is claimed is:

1. A connector adapted to sealingly and removeably engage a pipe coupling, said pipe coupling having a coupling sleeve with a threaded outer portion, an inner circular-cylindrical sealing surface, and a sealing surface sloping radially outward which is adjacent to said inner circular-cylindrical sealing surface, said connector comprising:

a pot-shaped coupling ring extending from an end wall to a free end via a circumferential side wall;

said circumferential side wall having a threaded inner portion which is adapted to threadedly engage said threaded outer portion of said coupling sleeve in a sealing position;

an axial member to which said coupling ring is mounted so as to be rotatable thereabout;

said axial member having a ring shoulder, a convex sealing shoulder, and a cylindrical nipple;

said convex sealing shoulder extending radially inwardly from said ring shoulder to said cylindrical nipple;

said cylindrical nipple being disposed fully within said circumferential side wall of said coupling ring such that said circumferential side wall protrudes axially past a free end of said cylindrical nipple, wherein:

said cylindrical nipple is adapted to carry a ring seal for forming a seal at said circular-cylindrical sealing surface of said coupling sleeve when said threaded inner portion is in said sealing position; and said convex sealing shoulder is adapted to sealingly abut said sealing surface sloping radially outward when said threaded inner portion is in said sealing position.

2. The connector of claim 1, wherein:

an outer diameter of said cylindrical nipple corresponds to a diameter of said circular-cylindrical sealing surface of said coupling sleeve; and a ratio of an axial length of said cylindrical nipple to said outer diameter is approximately 0.3 to approximately 0.4.

3. The connector of claim 1, wherein:

said cylindrical nipple comprises a cylindrical region adjacent to said convex sealing shoulder, and a ring groove adjacent to said cylindrical region; and said ring groove is adapted to carry said ring seal.

4. The connector of claim 3, wherein:

an outer diameter of said cylindrical region of said cylindrical nipple corresponds to a diameter of said circular-cylindrical sealing surface of said coupling sleeve; and an axial length of said cylindrical region of said cylindrical nipple is approximately $1/10$th to approximately $3/10$ths of said outer diameter.

5. The connector of claim 3, wherein:

said cylindrical nipple further comprises a retaining flange at said free end of said cylindrical nipple, adjacent to said ring groove; and said retaining flange is adapted to retain said ring seal on said ring groove.

6. The connector of claim 5, wherein:

an axial length of said retaining flange is approximately $1/100$th to approximately $5/100$ths of said outer diameter.

7. The connector of claim 1, wherein:

said free end of said coupling ring protrudes over said free end of said nipple by at least approximately 2.5 mm.

8. The connector of claim 1, wherein:

said threaded inner portion of said pot-shaped coupling ring is adapted to slide on a cylindrical guide surface of said coupling sleeve prior to threadedly engaging said threaded outer portion of said coupling sleeve, thereby aligning said cylindrical nipple with said circular-cylindrical sealing surface of said coupling sleeve.

9. The connector of claim 8, wherein:

said cylindrical nipple and said convex sealing shoulder move axially toward said sealing position as said threaded inner portion of said pot-shaped coupling ring is rotated about said threaded outer portion of said coupling sleeve.

10. The connector of claim 1, wherein:

said sealing surface sloping radially outward is frusto-conical.

11. The connector of claim 1, wherein:

said coupling ring is essentially axially immovable with respect to said axial member.

12. The connector of claim 1, wherein:

said end wall of said pot-shaped coupling ring rests against said ring shoulder.

13. The connector of claim 1, wherein:

said ring shoulder is cylindrical, and has an axial length which is approximately ½ to approximately twice an outer diameter thereof.

14. The connector of claim 5, wherein:

said retaining flange includes an opening over a circumferential area thereof for providing access to said ring groove.

15. The connector of claim 14, wherein:

said opening is delimited by a chord of a circular cross section of said retaining flange extending at a tangent to said ring groove.

16. The connector of claim 14, wherein:

said opening allows replacement of said ring seal in said ring groove.

17. In combination, a pipe coupling and a connector adapted to sealingly and removeably engage said pipe coupling;

said pipe coupling comprising a coupling sleeve with a threaded outer portion, an inner circular-cylindrical sealing surface, and a sealing surface sloping radially outward which is adjacent to said inner circular-cylindrical sealing surface;

said connector comprising:

a pot-shaped coupling ring extending from an end wall to a free end via a circumferential side wall;

said circumferential side wall having a threaded inner portion which is adapted to threadedly engage said threaded outer portion of said coupling sleeve in a sealing position; and an axial member to which said coupling ring is mounted so as to be rotatable thereabout;

said axial member having a ring shoulder, a convex sealing shoulder, and a cylindrical nipple;

said convex sealing shoulder extending radially inwardly from said ring shoulder to said cylindrical nipple;

said cylindrical nipple being disposed fully within said circumferential side wall of said coupling ring such that said circumferential side wall protrudes axially past a free end of said cylindrical nipple, wherein:

said cylindrical nipple is adapted to carry a ring seal for forming a seal at said circular-cylindrical sealing surface of said coupling sleeve when said threaded inner portion is in said sealing position; and said convex sealing shoulder is adapted to sealingly abut said sealing surface sloping radially outward when said threaded inner portion is in said sealing position.

18. The combination of claim 17, wherein:

an outer diameter of said cylindrical nipple corresponds to a diameter of said circular-cylindrical sealing surface of said coupling sleeve; and a ratio of an axial length of said cylindrical nipple to said outer diameter is approximately 0.3 to approximately 0.4.

19. The combination of claim 17, wherein:

said coupling sleeve has a cylindrical guide surface extending from a free end thereof to said threaded outer portion; and said threaded inner portion of said pot-shaped coupling ring is adapted to slide on said cylindrical guide surface prior to threadedly engaging said threaded outer portion of said coupling sleeve, thereby aligning said cylindrical nipple with said circular-cylindrical sealing surface of said coupling sleeve.

* * * * *